United States Patent
Schierling (10) Patent No.: US 11,837,864 B2
(45) Date of Patent: Dec. 5, 2023

(54) PULSE CIRCUIT FOR PROVIDING A FAULT CURRENT IN A DC VOLTAGE POWER SUPPLY GRID

(71) Applicant: Siemens Aktiengesellschaft, Munich (DE)

(72) Inventor: Hubert Schierling, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 343 days.

(21) Appl. No.: 17/418,484

(22) PCT Filed: Dec. 12, 2019

(86) PCT No.: PCT/EP2019/084875
§ 371 (c)(1),
(2) Date: Jun. 25, 2021

(87) PCT Pub. No.: WO2020/136017
PCT Pub. Date: Jul. 2, 2020

(65) Prior Publication Data
US 2022/0102967 A1    Mar. 31, 2022

(30) Foreign Application Priority Data
Dec. 27, 2018 (EP) .................................. 18248046

(51) Int. Cl.
*H02H 7/26* (2006.01)
*H02H 3/02* (2006.01)
*H02H 3/087* (2006.01)
*H02J 1/12* (2006.01)

(52) U.S. Cl.
CPC ............ *H02H 7/268* (2013.01); *H02H 3/025* (2013.01); *H02H 3/087* (2013.01); *H02J 1/12* (2013.01)

(58) Field of Classification Search
CPC .......... H02H 7/268; H02H 7/26; H02H 3/025; H02H 3/02; H02H 3/087; H02H 3/08; H02J 1/12
See application file for complete search history.

(56) References Cited

U.S. PATENT DOCUMENTS

2017/0229964 A1    8/2017   Jarvelainen et al.

FOREIGN PATENT DOCUMENTS

DE        102014002933 A1    8/2015
EP            3203595 A1     8/2017

*Primary Examiner* — Robert L Deberadinis
(74) *Attorney, Agent, or Firm* — Henry M. Feiereisen LLC (57) ABSTRACT

Electrical devices are connected to a DC voltage power supply grid being connected to a power source and having a supply voltage. Protection devices protect the electrical devices against an unintentional overcurrent sensed by a sensor unit. The protection devices disconnect the electrical devices from the DC voltage power supply grid when an overcurrent is detected. A pulse circuit having a capacitor with a semiconductor switching element connected in series with the capacitor is connected to respective inputs of the protection devices and supplies an amount of electric charge when a voltage dip occurs, wherein the amount of supplied electric charge is determined based on the detected overcurrent and a predetermined time period.

12 Claims, 5 Drawing Sheets

PULSE CIRCUIT FOR PROVIDING A FAULT CURRENT IN A DC VOLTAGE POWER SUPPLY GRID

CROSS-REFERENCES TO RELATED APPLICATIONS

This application is the U.S. National Stage of international Application No. PCT/EP2019/084875, filed Dec. 12, 2019, which designated the United States and has been published as International Publication No. WO 2020/136017 A1 and which claims the priority of European Patent Application, Serial No. 18248046.7, filed Dec. 27, 2018, pursuant to 35 U.S.C. 119(a)-(d).

BACKGROUND OF THE INVENTION

The invention relates to a power supply grid for electrically coupling at least two electrical devices connected to the power supply grid, with at least one electrical power source connected to the power supply grid, using a predefinable electrical supply voltage, wherein the power supply grid is designed as a DC voltage power supply grid, with a power source connection for connecting the at least one electrical power source, electrical device connections for connecting a respective one of the at least two electrical devices, respective protective devices, electrically connected to the device connections, for protecting the respective one of the device connections against an unintended overcurrent, wherein each protective device has a sensor unit at least for detecting an electric current at the respective device connection and a switching unit, wherein the switching unit is designed to deactivate the respective device connection as a function of a determination of the overcurrent, and at least two electrical lines to which the supply voltage is applied and of which at least one line electrically couples the at least one power source connection to the protective devices. The invention also relates to a method for electrically coupling at least two electrical devices connected to a power supply grid, with at least one electrical power source which is connected to the power supply grid, using a predefined electrical supply voltage, wherein the power supply grid is designed as a DC voltage power supply grid, wherein the at least one electrical power source is connected to a power source connection of the power supply grid, the at least two electrical devices are connected to respective electrical device connections of the power supply grid, the device connections are protected against an unintended overcurrent by means of respective protective devices, which are electrically connected to the device connections, in that a sensor unit of a respective one of the protective devices detects at least one respective electrical current and by means of a respective switching unit deactivates the respective device connection as a function of a determination of the overcurrent, and the at least one power source connection is electrically coupled to the protective devices by means of at least one of at least two electrical lines to which the supply voltage is applied.

Generic power supply grids and methods of the generic type are known extensively in the prior art, so there is no need for separate documentary evidence for this purpose. Power supply grids and generic methods serve to be able to exchange electrical power between electrical power sources and electrical devices, in particular electrical loads such that an intended operation of the electrical devices and power sources connected to the power supply grid can be achieved, in this case, an electrical power source need not be operated as a power source in each operating state, instead it can be operated as an electrical load or as an electrical device as a function of a respective operating state of the power source. Furthermore, this also applies, of course, to the electrical devices which, for their part, do not necessarily have to be operated as an electrical load in each operating state, but can also serve as a power source as a function of the respective operating state of the electrical device. As a rule, however, it is provided that the power source predominantly supplies electrical power via the power supply grid and that the electrical devices predominantly draw electrical power from the power supply grid in order to be able to achieve their intended operation.

Power supply grids and also methods for the operation thereof are extensively used in the prior art. As a rule, it is provided that a protective device is provided at least for each electrical device connected to the power supply grid, which protective device serves to protect against any overcurrent that occurs. For this purpose, an electric current at a respective one of the power source connections is detected and evaluated by means of a current sensor. The evaluation comprises, in particular, a comparison of the detected value of the electrical current with a predefined comparison value. If the comparison shows that the value of the detected current is greater than the comparison value, this is determined as an overcurrent and a corresponding control signal is emitted to the switching unit, by means of which the corresponding electrical device connection can be deactivated as a function of the control signal. Fundamentally, this protective principle can, of course, also be provided for the at least one electrical power source.

In the prior art, it is customary that an electrical grid, which is used for distributing electrical power, can have a respective specific topology, in particular different power distribution levels or supply levels, by which, for example, a type of tree structure can be formed.

Particularly if electrical devices are connected to the power supply grid at different electrical powers from one another, the problem can occur that, in the event of an overcurrent, in particular a short-circuit current in a short-circuit case, in the case of a respective one of the electrical devices, the protective device does not first deactivate or trigger the electrical device to which the electrical device is connected in which the overcurrent or the short-circuit current occurs, but, for example, an adjacently arranged protective device, a higher-level protective device of a higher-level supply level or the like. However, this is not desirable because, as a result, the intended operation of the further electrical devices, which are connected to the power supply grid, can be disturbed. The principle that the protective device, at which the overcurrent occurs, triggers first is also called selectivity.

If a fault occurs, in particular a short circuit in an extended DC voltage supply grid as a power supply grid, it is desirable that the selectivity be reliably ensured. In other words, exactly the device connection is always to be switched off by means of the protective device in which the fault, for example the overcurrent or short-circuit current, has occurred.

Many electrical devices, in particular in the field of the DC voltage application, provide a non-negligible electrical capacitance on the device connection side. This can occur, for example, by way of a capacitor or the like. When such electrical devices of different power are now connected to the DC voltage supply grid, if a fault occurs, for example a short circuit, in which that one of the electrical devices, which has a large electrical power, a corresponding short-circuit current can be the result.

As a rule, the protective device requires a certain period of time in order to reliably determine the fault or the short circuit and to deactivate the corresponding device connection by means of the switching unit thereof. Until the corresponding electrical device is switched off by means of the protective device, a correspondingly large current flows from the power supply grid into the electrical device affected by the fault, however. This current can be drawn from adjacently arranged electrical devices due to line inductances and the like, for example if they provide a corresponding capacitance on the connection side. If such an electrical device is designed for a small electrical power, the case can occur that the capacitance of this electrical device supplies a corresponding current, which is supplied via the protective device to which this electrical device is connected, to the protective device at which the fault or the short circuit has occurred. In such a case, the principle of selectivity can no longer be ensured, and this electric device is switched off by means of the associated protective device, even though there is no fault, because, for example, the comparison value of this corresponding protective device is smaller than the comparison value of the protective device in which the fault or the short circuit has occurred.

In power supply grids, to which an alternating voltage is applied as the supply voltage, it is known, for example, to couple the protective devices via communication lines in a manner corresponding to one another in communication terms. As a result, by appropriate communication between the protective devices, it can be achieved that the principle of selectivity can be implemented. However, this is comparatively complex and, in particular, less suitable for use with DC voltage as the supply voltage, because the short circuit must be switched off very quickly in order to ensure the selectivity and the requirement for the reaction speed of the communication would be very high.

The invention is therefore based on the object of improving the selectivity in a power supply grid, in particular when it is supplied with a DC voltage as the supply voltage.

SUMMARY OF THE INVENTION

The invention proposes a power supply grid and a method as claimed in the independent claims as a solution.

Advantageous developments are obtained on the basis of the features of the dependent claims.

In respect of a generic power supply grid, it is proposed, in particular, that the at least two electrical lines are electrically coupled to a pulse circuit for discharging a pre-definable electrical charge quantity with at least one capacitor, which is designed to discharge the electrical charge quantity when a voltage dip of the supply voltage occurs, wherein the charge quantity is determined at least as a function of the overcurrent and a pre-definable period of time for discharging the charge quantity.

In respect of a generic method, it is proposed, in particular, that a pulse circuit for discharging a predefined electrical charge quantity is connected to at least one capacitor on the at least two electrical lines, wherein the electrical charge quantity is discharged by means of the pulse circuit when a voltage dip of the supply voltage occurs, wherein the charge quantity is determined at least as a function of the overcurrent and a predefined period of time for discharging the charge quantity.

The invention is based on the idea that by way of the pulse circuit it is possible for a predefined electrical charge quantity to be fed into the power supply grid on the power supply grid side for the predefined period of time or the pre-definable period of time, which charge quantity is provided in particular as a function of the overcurrent and preferably for the predefined period of time. As a result, in the event of a fault or in the event of a short circuit in one of the electrical devices, the overcurrent does not have to be at least provided completely by one or more of the further electrical device(s), so the reliable deactivation of the device connection concerned, at which the fault or the short circuit has occurred, can be ensured without the need for the further electrical devices or the at least one electrical power source to be affected. In this way, in particular, the selectivity can be improved and the operational readiness of the further electrical devices can also be more reliably ensured.

The invention makes it possible, therefore to significantly improve the selectivity with a comparatively low outlay. The problem occurring in the prior art, that electrical devices which are not affected are undesirably deactivated, can thus be significantly reduced, but not only in the case of power supply grids which are operated with a DC voltage.

The power source connection is preferably designed in accordance with the power source to be connected, for example in respect of the electromechanical connection, number of connection poles and/or the like. The power source connection can thus have at least two electrical connection poles, to which a correspondingly two-pole power source can be connected. Furthermore, the power source connection can also be connected to a respective protective device, which is fundamentally designed to correspond to the protective devices, which are electrically connected to the corresponding respective device connections. Furthermore, in the case of a plurality of electrical power sources, it can be provided that not all of the power source connections need to be connected to a corresponding protective device. This can be dependent on individual properties of the power supply grid in conjunction with the respective connected power sources. The electrical power source connections are designed in such a way therefore, that they have at least two connection poles, so a correspondingly designed electrical device can be connected thereto.

Furthermore, the power supply grid has the at least two electrical lines, by means of which the protective devices are electrically coupled to the at least one power source connection. One of the electrical lines can also be formed by an electrical reference potential such as a plant ground or the like. Furthermore, it is, of course, also possible to provide that one of the lines is merely looped through the protective device. This line can also be connected directly to the device connection, bypassing the protective device. Combinations thereof can also be provided.

The number of electrical lines can be dependent, in particular, on which supply voltage is used for distributing the electrical power. In the case of two electrical lines, the supply voltage can be a DC voltage, therefore. Furthermore, the power supply grid can additionally also comprise a single-phase or a multi-phase AC voltage. Furthermore, it is, of course, possible that if a multi-phase AC voltage is used as the supply voltage, electrical lines are provided for distributing the power corresponding to the number of phases. A configuration of this kind can use, for example, a three-phase electrical supply voltage, which then uses at least three electrical lines, and, more precisely, for each phase of at least one electrical line. Furthermore, in the case of a three-phase AC voltage as a supply voltage, it can additionally be provided that a fourth line is provided to which a zero potential is applied. However, the invention is not limited to the application of said voltages.

Furthermore, a respective protective device is provided for at least each of the device connections to which the electrical devices can be connected, which protective device is used to protect the respective one of the device connections from an unintended overcurrent. For this purpose, the protective device comprises a sensor unit by means of which at least one electric current can be detected at the respective device connection. In this regard, the sensor can comprise a current sensor, for example a Hall probe, a Rogowski coil, a shunt, and/or the like. The sensor unit is preferably designed to provide a comparison functionality in which an electrical value of the electrical current, which has been detected by means of the sensor unit, can be compared with a comparison value. For the comparison, it can be provided that an amount of the value of the electric current, an effective value or the like, is determined beforehand in order to be able to carry out the comparison. The sensor unit then provides a control signal as a function of the comparison.

The protective device also comprises the switching unit, which is designed to deactivate the respective device connection as a function of the detection of the overcurrent. For this purpose, the switching unit is connected in communication terms to the sensor unit and can preferably be controlled in the desired manner by means of the control signal of the sensor unit. If an overcurrent is determined or found by means of the sensor unit, for example if an amount of the value of the detected electric current is greater than the comparison value, the switching unit can be controlled by means of the control signal in such a way that the device connection is correspondingly deactivated. For this purpose, the switching unit can comprise electromechanical switching elements, for example in the manner of a relay, a contactor or the like, in order to be able to provide the desired switching functionality. Furthermore, the switching unit can, in particular, also have at least one semiconductor switching element by means of which the desired switching function can be at least partially implemented. However, as a rule, the switching unit is not designed to implement a current-limiting function in order to be able to largely prevent undesired effects on the connected electrical device.

A semiconductor switching element or switching element within the meaning of this disclosure is preferably a controllable electronic switching element, for example a controllable electronic semiconductor switch such as a transistor which is operated in a switching mode, a thyristor, combination circuits thereof, preferably with parallel-connected inverse diodes, a gate turn-off thyristor (GTO), an insulated gate bipolar transistor (IGBT), combinations thereof, or the like. However, the switching element can fundamentally also be formed by a field effect transistor, in particular a metal oxide semiconductor field effect transistor (MOSFET).

In order to achieve the desired switching function by way of a transistor, the transistor is operated in the switching mode. In relation to a semiconductor switch using a transistor, the switching mode means that, in a switched-on switching state, a very small electrical resistance is provided between the connections of the transistor forming a switching path, so a high current flow is possible with a very small residual voltage. In contrast, in a switched-off switching state, the switching path of the transit gate is high-impedance, in other words, it provides a high electrical resistance, so even with high electrical voltage which is applied to the switching path there is substantially no or only a very small, in particular a negligible, current flow. This is distinct from a linear operation in the case of transistors, which, however, as a rule, are not used in the switching mode.

In order to implement the control function, the switching elements each have at least one control connection to which the control signal can be applied so the desired switching function of the switching element can be implemented. The control signal can be a binary switching signal, which can assume two state values in order to be able to provide the desired switching functions of the switching element. For example, the switching signal can be formed by a pulse sequence, by means of which the control connection is acted upon. This is primarily expedient with thyristors and GTO. Furthermore, with transistors, the switching signal can be a square-wave signal, wherein a respective switching state of the switching element can be associated with one of the potentials of the square-wave signal. Such a signal is suitable, for example, for transistors, in particular for bipolar transistors, field effect transistors or the like.

Inventively, the pulse circuit is connected to the at least two electrical lines in order to discharge the pre-definable electrical charge quantity. The pulse circuit is used to discharge the pre-definable electrical charge quantity, in particular, when a voltage dip in the supply voltage occurs. As a rule, such a voltage dip occurs when a fault is present in one of the connected electrical devices, in particular a short circuit, which leads to a particularly high current requirement being generated at the respective device connection. This current requirement, also referred to as overcurrent, is not part of the intended operation of the electrical device and of the power supply grid, and represents an unintended overcurrent, therefore. Since, as a rule, the electrical lines have at least inductive properties, this can lead, particularly in the case of a spatially distributed power supply grid, to the fact that a voltage dip, due to the unintended overcurrent, can have a very strong effect in the cased of electrical devices which are connected spatially directly adjacent. By way of the pulse circuit, it can now be achieved that a pre-definable or predefined electrical charge quantity is discharged, so these effects of the unintended overcurrent, in particular on the electrical devices arranged spatially directly adjacent, can be reduced or limited. As a result, it can be achieved that an undesired deactivation of electrical devices, in which no fault is present, can be better avoided. By way of the pulse circuit, it is possible to significantly improve the selectivity, therefore. The pulse circuit is preferably coupled to the electrical lines in such a way that the intended function can be made available regardless of an operating state of the protective device. In particular, it is preferably not connected on the load side.

In order to be able to provide the charge quantity, the pulse circuit has at least one capacitor. Of course, the pulse circuit can also comprise a plurality of capacitors which are connected at different points of the electrical lines, moreover. In this case, the pulse circuit can be designed, for example, so as to be distributed over the power supply grid, therefore. The pulse circuit need not only have a single capacitor, therefore. Furthermore, this design makes it possible for the individual capacitors to be designed to be smaller in respect of the value of their capacitance.

For designing the capacitance of the at least one capacitor, it is possible to consider that the at least two electrical lines provide a predefined line inductance in the case of the unintended overcurrent, which line inductance can be at least partially compensated by means of the pulse circuit. Furthermore, the value of the capacitance of the at least one capacitor can at least partially also be selected as a function of how large the unintended overcurrent can be and for which predefined period of time the function of the pulse circuit is required. From this, the predefined or pre-definable charge quantity may be determined, which can then be used to determine the value of the capacitance of the at least one capacitor, taking into account the supply voltage. In addition, empirical investigations can of course also be considered here in order to be able to better take into account specific properties of the power supply grid.

The overcurrent is an electric current at the device connection of the respective protective device, which current is greater than the comparison value of the respective protective device. The overcurrent is dependent on the respective provided comparison value of the protective device, therefore. Thus, the pre-definable charge quantity can be determined, for example, on the basis of the minimally occurring overcurrent. However, the charge quantity can also be determined as a function of a larger value of the overcurrent than the minimum value of the overcurrent in order to influence the triggering reliability or the like. In this case, it is possible to take into account how large the overcurrent at the electrical device connection can be. The overcurrent is a current detected by means of the sensor unit, therefore, the value of which is greater than the comparison value.

Furthermore, one or more triggering characteristic(s) of the protective device, in particular of the switching unit, can also be taken into account. Thus, for example, a triggering speed of the protective device, in particular of the switching unit, can be dependent on a magnitude of the value of the overcurrent. For example, the triggering speed with a large value of the overcurrent can be less than with a small value of the overcurrent.

The pre-definable period of time can be determined, for example, on the basis of such triggering behavior or such a triggering characteristic. As a result, it can be achieved that the charge quantity can preferably be discharged within the pre-definable period of time so the reliability can be at least improved with regard to the selectivity. The pre-definable period of time can extend, for example, from about 0.0001 s to about 0.1 s, preferably from about 0.001 s to about 0.01 s. In particular, the pre-definable charge quantity can be determined taking into account the pre-definable period of time and the overcurrent. The capacitance of the at least one capacitor can then be determined therefrom.

The pre-definable charge quantity and/or the pre-definable period of time can be selected or predefined specifically adapted to the triggering characteristics of at least one of the protective devices, therefore. If a plurality of pulse circuits is present, which are associated with respective protective devices, the respective predefined periods of time and/or charge quantities can be at least partially adapted to the respectively associated one of the protective devices. As a result, the pulse circuits can be designed to be adapted to the specific requirements in each case. The pulse circuits can therefore—just like the protective devices can have triggering properties or triggering characteristics which differ from one another—also have predefined periods of time and/or charge quantities correspondingly differing from each other.

The pulse circuit provides the electrical charge quantity, preferably in an automated manner, on the occurrence of a voltage dip of the supply voltage. Therefore, fundamentally no further effort is required to discharge or provide the electrical charge quantity in the desired manner.

The power supply grid is designed as a DC voltage power supply grid. The invention is particularly suitable precisely in the case of DC voltage power supply grids because it enables a significant improvement with respect to the selectivity with little effort with reliable functionality. The invention is fundamentally suitable for power supply grids, therefore, the supply voltage of which uses at least one DC voltage or, in addition to the DC voltage, also an alternating voltage.

The pre-definable or predefined period of time can be determined, inter alia, preferably as a function of how the protective device reacts to the unintended overcurrent in each case, for example which triggering characteristic it uses for the deactivation in the case of an unintended overcurrent. This need not be the same for all of the protective devices. For the determination of the period of time, it is therefore possible, for example, to use the most unfavorable triggering characteristic. In the case of a pulse circuit arranged over the spatial extension of the power supply grid, it can furthermore be provided that the period of time is determined as a function of a respective position in the power supply grid. For this purpose, specific properties of the power supply grid and also of the electrical devices and/or electrical power sources connected thereto can be taken into account.

A switching element, which is preferably designed as a semiconductor switching element, is connected in series with the at least one capacitor. As a result, it can be achieved that although the charge quantity can be inventively provided, at the same time the effect of the at least one capacitor and consequently also of the pulse circuit on the power supply grid can be reduced overall.

The period of time is preferably determined as a function of at least one characteristic property of at least one of the protective devices. The characteristic property can be, for example, a triggering current, the triggering characteristic, and/or the like. The triggering current can be determined, for example, as a function of the comparison value. Furthermore, line inductances can be considered to determine the period of time. Overall, this makes it possible to further improve the power supply grid.

Furthermore, it is proposed that, in the case of protective devices which are designed for unintended overcurrents of different sizes, the charge quantity is determined at least as a function of the greatest of the overcurrents. As a result, it can be ensured that, even in the case of a protective device which permits a particularly large unintended overcurrent, it is possible to ensure the selectivity.

The switching element preferably comprises a first diode or is formed by a first diode. This embodiment is particularly suitable for power supply grids, whose supply voltage Is a direct voltage. As a result, an intended discharge of the charge quantity can be achieved without the need for additional control effort if the switching element comprises only the first diode. At the same time, the action of the capacitor or of the pulse circuit can be reduced during the intended operation, in other words, when no unintended overcurrent occurs. The diode should be selected so as to be adapted in respect of its voltage endurance and also its limit load integral. If the pulse circuit is a pulse circuit with a plurality of capacitors, it can be provided that each of the capacitors is connected to the lines by means of its own diode.

Alternatively or additionally, it can also be provided that the switching element is designed to be controllable by means of a control signal. In this embodiment, a voltage sensor can be provided, by means of which the voltage dip can be detected. Depending on the detection of the voltage dip, the switching element is switched to the switched-on switching state so the pulse circuit can provide the desired charge quantity. Of course, this configuration can also be combined with diodes as the switching elements, in particular in the case of a pulse circuit formed by the power supply grid. The switching element can preferably be a semiconductor switching element such as a transistor, a thyristor or the like.

In particular, it can be provided that the power supply grid has a control unit coupled to the sensor units for signaling purposes to provide a control signal for the switching element of the pulse circuit. As a result, it is possible, preferably regardless of the function of the protective devices, to detect and evaluate the respective electrical currents and to generate the control signal for the switching element of the pulse circuit therefrom. In this way, the functionality can be further improved. In particular, the design is suitable by means of the controllable switching element for use with a supply voltage which is provided as an alternating voltage.

A development provides that the pulse circuit is designed at least partially in one piece with at least one of the protective devices. The pulse circuit can be arranged, for example, at least partially in a housing of at least one of the protective devices. It can also be provided that a respective pulse circuit is integrated in a plurality of, in particular all, protective devices. Preferably, the pulse circuit within the protective device is connected in such a way that the current to be possibly provided by it or the charge quantity to be discharged by it can be discharged to the at least two electrical lines to which the supply voltage is applied without the sensor unit having to detect this. The sensor unit can therefore detect the charge quantity only when the overcurrent relates to a device connected directly to the device connection. Furthermore, the pulse circuit can preferably be connected within the protective device in such a way that the current to be possibly provided by it can be discharged at the respective device connection of the protective device in such a way that it can be detected by the sensor unit. Preferably, the pulse circuit is connected within the protective device in such a way that the function of the pulse circuit can be made available substantially regardless of a switching state of the switching unit of the protective device. The charge quantity is preferably discharged to the electrical lines, therefore.

For example, it can be provided that the at least one capacitor is integrated in one of the protective devices in such a way that in the event of an unintended overcurrent the discharged or dischargeable charge quantity can be made available directly in the region of the protective device, therefore. As a result, the effects on the power supply grid and the further electrical devices can be reduced particularly favorably. At the same time, this embodiment makes it possible to integrate the pulse circuit into the power supply grid in a simple manner and automatically provide a corresponding functionality at the same time as the provision of the power supply grid. In this embodiment, it is no longer necessary to provide a separate pulse circuit. Of course a separate pulse circuit can additionally also be provided, however. The pulse circuit can, of course, also be designed to be integrated in a plurality of the protective devices. Furthermore, each of the protective devices can comprise its own pulse circuit. This can be adapted individually to the respective protective device.

It is also proposed that the pulse circuit has a series circuit connected in parallel with the first diode and comprising a second diode connected inversely to the first diode and an electrical resistor, in particular a varistor. The first diode makes it possible for the pulse circuit to discharge the predefined charge quantity as intended. The second diode ensures that the capacitor can be charged via the electrical resistor or the varistor. If a varistor is provided, a voltage-limiting function can also be implemented by the pulse circuit at the same time. As a result of their inverse connection, the diodes determine opposite current directions with respect to the capacitor, therefore and consequently also with respect to the pulse circuit.

Furthermore, it is proposed that the switching unit has a semiconductor switching element and the pulse circuit has a third diode connected to the second diode, so the second and the third diode are wired anti-serially and whose central connection is connected via the electrical resistor, in particular the varistor, to the capacitor, with the anti-serially wired diodes being connected in parallel with the semiconductor switching element. The varistor can therefore not only be used for limiting the voltage, but it can also serve to charge the at least one capacitor. Finally, this development also makes it possible to charge the capacitor on the part of the device connection when the switching unit is in the switched-off switching state and an electrical device connected thereto provides an electrical voltage, for example a power source or the like.

Of course, the advantages and effects disclosed for the inventive power supply grid apply equally to the inventive method, and vice versa. As a result, device features can, of course, also be formulated as method features, and vice versa.

BRIEF DESCRIPTION OF THE DRAWING

Further advantages and features emerge from the following description of exemplary embodiments with reference to the figures. In the figures, identical reference numerals indicate identical features and functions.

In the drawings.

DETAILED DESCRIPTION OF PREFERRED EMBODIMENTS

Figure 1:
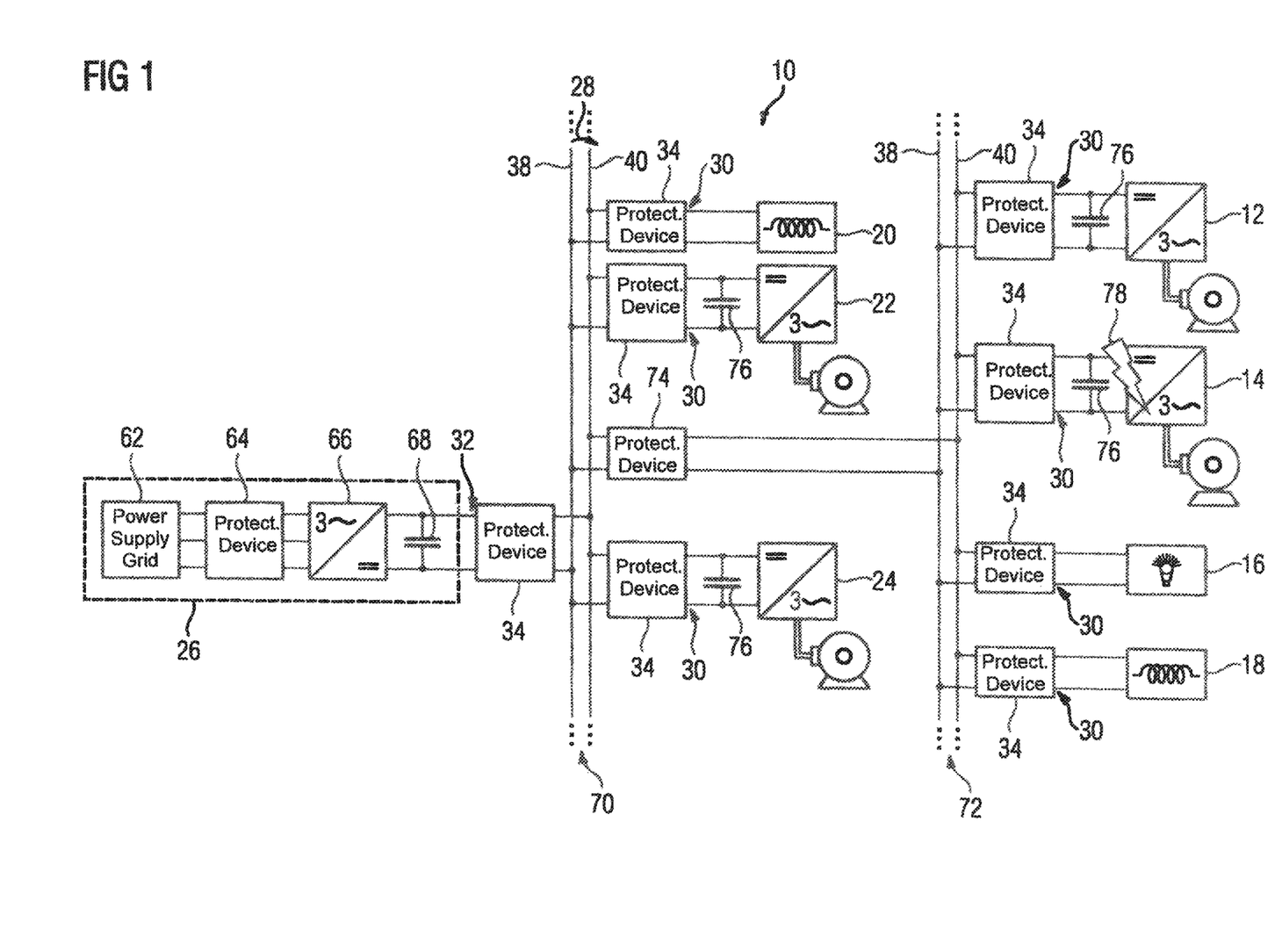
FIG. 1 shows in a schematic block diagram a DC voltage power supply grid with two supply levels to which a public power supply grid is connected as a power source and to which a series of electrical devices are connected as loads.

FIG. 1 shows, in a schematic block diagram, a DC voltage power supply grid 10, by means of which electrical devices 12 to 24 connected to the power supply grid are electrically coupled to an electrical power source 26 connected to the DC voltage power supply grid 10. In the present case, the power source 26 is formed by a public power supply grid 62, which provides a three-phase AC voltage of about 400 V. Furthermore, the three-phase AC voltage is provided via a protective device 64 which, in turn, is connected to a rectifier 66 which rectifies the three-phase AC voltage in a predefined manner and provides a corresponding DC voltage 28 as a supply voltage at a capacitor 68. The power source 26 is connected to a power source terminal 32 of the DC voltage power supply grid 10.

The DC voltage power supply grid 10 has a first supply plane 70 and a second supply plane 72, which are coupled to one another via a protective device 74. Also connected to the first supply level 70 is a protective device 34, which provides the power source connection 32 to which the power source 26 is connected.

The supply planes 70, 72 each comprise two electrical lines 38, 40 to which, in the coupled state, the DC voltage 28 provided at the capacitor 68 via the protective device 74 is applied. Purely by way of example, protective devices 34, which provide respective device connections 30, are connected to the first supply plane 70. A heating element 20, an inverter 22 and an inverter 24 are connected to these protective devices 34. Respective electrical machines, which are not further designated, are connected to the inverters 22, 24. However, the first supply plane 70 can also comprise further protective devices 34 with further electrical devices.

In the present case, four protective devices 34 are connected to the second supply plane 72, which is fundamentally designed so as to be comparable to the first supply plane 72. Two inverters 12, 14, a lighting device 16 and a heating element 18 are connected to these protective devices. The second supply level 72 can also comprise further protective devices 34 with further electrical devices connected thereto. Respective electric machines, not designated, are connected to the inverters 12, 14.

The protective devices 34 as well as the protective device 74 are used to protect the respective device connections 30 or the power source connection 32 from an unintended overcurrent. Each of the protective devices 34, 74 comprises, for this purpose, a sensor unit 50, which is used to detect an electrical current at the respective device connection 30 or power source connection 32.

Furthermore, each of the protective devices 34 comprises a switching unit 48 (FIG. 2) which is designed to deactivate the respective device connection 30 or the power source connection 32 as a function of a determination of the overcurrent. For this purpose, the sensor unit 50 is designed to compare the detected electrical current with a comparison value and to emit a control signal to the switching unit 48 when the comparison value is exceeded by an amount of the value of the electrical current, so the switching unit 48 deactivates the corresponding device connection 30 or the power source connection 32.

By means of the electrical lines 38, 40, the protective devices 34 are electrically coupled to one another and also to the power source connection 32. The coupling between the first supply plane 70 and the second supply plane 72 is effected by the protective device 74.

At each of the inverters 12, 14, 22, 24 a respective capacitor 76 is provided, which is electrically coupled to the respective electrical lines 38, 40 via the respective device connection 30.

Figure 2:
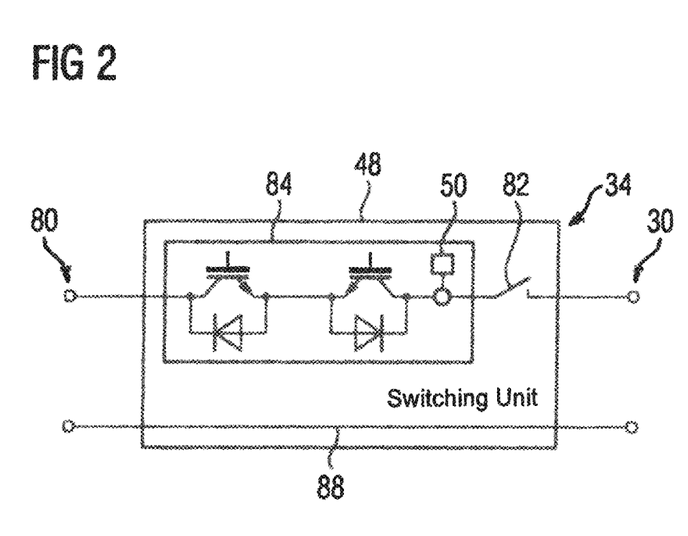
FIG. 2 shows a schematic circuit diagram of a protective device for the power supply grid of FIG. 1.

FIG. 2 shows the protective device 34 in a schematic circuit diagram. It can be seen that the protective device 34 provides the device connection 30 for connecting the electrical respective device. Opposite, a line connection 80 is provided, by means of which the protective device 34 can be connected to the electrical lines 38, 40. The switching unit 48, by means of which the device connection 30 can be deactivated, is formed between the line connection 80 and the device connection 30.

In a manner not further specified, the switching unit 48 has an electromechanical switching element 82, which can be actuated by means of a control signal (not shown). Furthermore, a semiconductor switching element 84 comprising two anti-serially wired transistors $T_1$, $T_2$ with non-designated inverse diodes is connected in series with the electromechanical switching element 82. The semiconductor switching element 84 can be controlled by means of a further control signal with regard to the switching state. In the present case, the transistors $T_1$, $T_2$ are formed by IGBT. In alternative embodiments, however, a field-effect transistor, in particular a MOSFET or the like, can also be used as a transistor.

Furthermore, the protective device 34 comprises the current sensor 50, by means of which the electrical current of the connected electrical device can be detected. The current sensor 50 also has an evaluation circuit (not shown), which compares the detected value of the electrical current, and, more precisely, the amount of the detected value of the electrical current, with the comparison value. If the amount of the value of the detected current is greater than the comparison value, the switching unit 48 is set to the switched-off switching state by means of a control signal so the device connection 30 is deactivated.

FIG. 1 shows that a short circuit 78 occurs in the inverter 14. This results in a very large current being briefly requested from the DC voltage power supply grid 10, which at the same time also flows through the associated protective device 34. The switching device 34 determines the overcurrent and switches the switching unit 48 into the switched-off switching state so the correspondingly associated device connection 30 is deactivated.

However, until the effectiveness of this switching off, the correspondingly detected current due to the short circuit 78 is very large. As explained below, this can cause problems with regard to selectivity.

In the present case, the inverter 14 is designed for a greater electrical power than the inverter 12 and the protective devices 34, which are associated with the respective device connections 30, are correspondingly adjusted to the respective powers of the inverters 12, 14.

Figure 3:
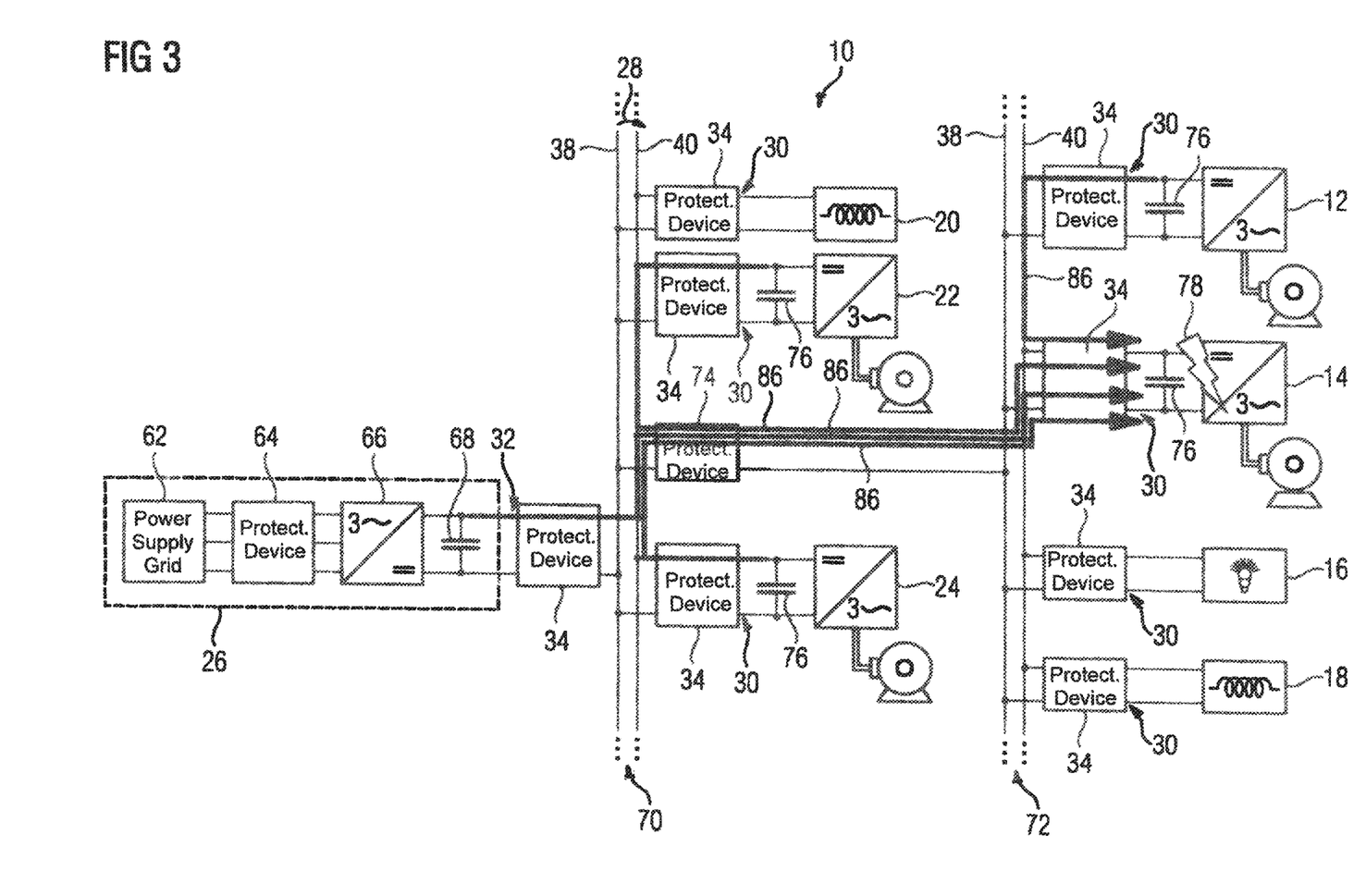
FIG. 3 shows a schematic block diagram like FIG. 1 in which a current flow in the case of a short circuit on one of the connected electrical devices is represented by means of power flow arrows.

As a result of the short circuit 78, a very large current can briefly be drawn from the capacitors 76 and the capacitor 68, therefore, which current is fed into the short circuit 78. FIG. 3 shows, in a schematic representation like FIG. 1, with corresponding current arrows 86 the current profiles in the DC voltage power supply grid 10. This can now lead to such a high current being applied to the protective device 34, to which the inverter 12 is connected, that its switching unit 48 is likewise switched to the switched-off switching state, as a result of which the corresponding device connection 30 is also deactivated even though no fault is present in this electrical device. The same can fundamentally also occur for the further protective devices 34 to which the inverters 22, 24 are connected, wherein also in respect of the power source 26. These are undesirable effects, which violate the principle of selectivity.

Figure 4:
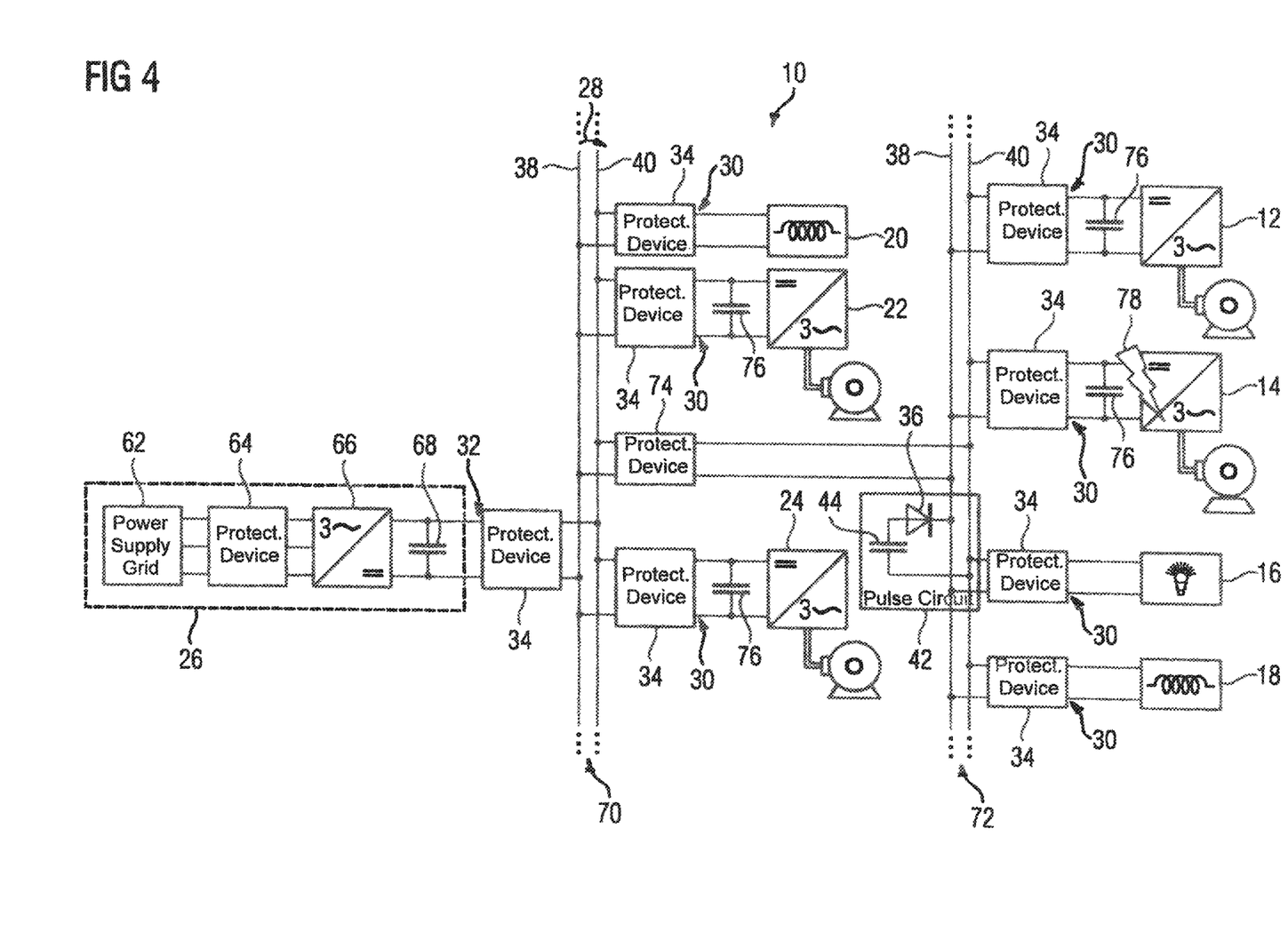
FIG. 4 shows a schematic circuit diagram like FIG. 1 in which a pulse circuit is additionally connected.

FIG. 4 shows, in a schematic circuit diagram like in FIG. 1, a possibility of reducing or even completely avoiding the above-mentioned problems. Namely, as in FIG. 4 it is provided that a pulse circuit 42 is connected to the electrical lines 38, 40, here at the second supply level 72, which circuit in the present case has a series circuit comprising a capacitor 44 and a diode 36.

The series connection and the polarity of the diode 36 are selected in such a way that, in the event of a voltage dip in the supply voltage 28 on the electrical lines 38, 40, an electrical charge is automatically fed for a predefined period of time, so an additional current flow is generated which is available for the short circuit 78. As a result, it is possible to reduce or even almost avoid the currents represented by the current arrows 86 in FIG. 3 from the capacitor 76 and the capacitor 68, so in this embodiment only the protective device 34 of the inverter 14 triggers in which the short circuit 78 has also occurred. In this case, the further protective devices 34 need not be actuated or do not intervene. As a result, even those devices which are connected are not impaired with regard to their intended function. As a result, the selectivity can be further ensured.

Although only a single pulse circuit 42 is represented in FIG. 4, in alternative embodiments it can be provided that, for example, at least one single pulse circuit 42 is provided at least for each supply plane 70, 72. Of course, it can also be provided for the supply planes 70, 72 that more than one single pulse circuit 42 is provided. It can be particularly advantageous if, for each of the protective devices 34, a pulse circuit 42, connected, preferably directly, to the respective protective device 34, is provided. In this way, a particularly good functionality can be achieved with respect to the selectivity.

Figure 5:
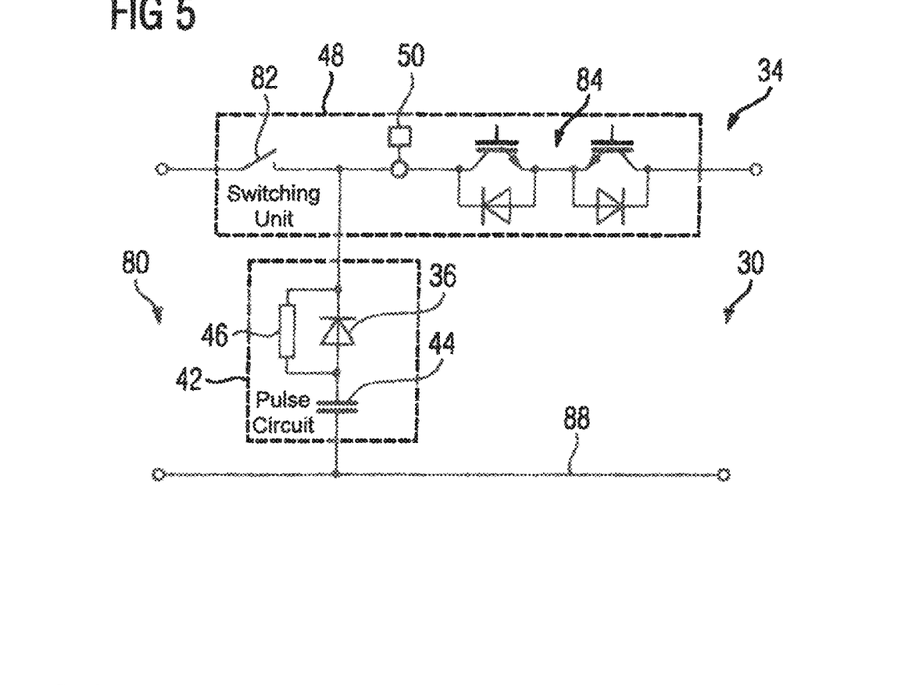
FIG. 5 shows a schematic circuit diagram of a protective device having an integrated pulse circuit.

A development results on the basis of FIG. 5, which shows a schematic circuit diagram of a protective device 34. The protective device 34 is based fundamentally on the protective device 34, as has already been explained with reference to FIG. 2, for which reason reference is made in addition to the embodiments in this regard. In addition to the protective device 34 in FIG. 2, the protective device 34 in FIG. 5 comprises an integrated pulse circuit 42. In the present case, the series circuit comprising the capacitor 44 and the diode 36 is connected between the electromechanical switching element 82 and the semiconductor switching element 84 on the one hand and to an implemented reference potential connection 88 on the other hand. The function of the pulse circuit 42 corresponds to that which has already been explained with reference to FIG. 4, which is why this is also referred to in addition to the corresponding embodiments. In alternative embodiments, the reference potential connection 88 need not be implemented by the protective device 34. It can also be connected directly to the device connection 30, bypassing the protective device 34.

Furthermore, the pulse circuit 42 in FIG. 5 comprises an electrical resistor 46 connected in parallel with the diode 36. The capacitor 44 can be charged by the electrical resistor 46, so it is capable of providing the desired charge quantity.

In the present case, a capacitance of the capacitor 44 is determined Inter alia as a function of which charge quantity is to be made available for which period of time so the corresponding protective device 34 can reliably trigger without further adjacent protective devices 34 being affected. For this purpose, triggering characteristics of the protective devices 34 can be taken into account in addition, Line inductances $L_1$, $L_2$ of the DC voltage source grid 10 can also be taken into account.

The advantage of this configuration is, inter alia, that the DC voltage power supply grid 10 can be designed and expanded as desired, it also being possible to simultaneously achieve the desired function with regard to selectivity by way of the provided protective devices 34, without the need for separately supplementary components, such as the separate pulse circuit 42, to be connected to the electrical lines 38, 40. Nevertheless, it is, of course, provided that additional pulse arrangements 42 can also be provided.

Figure 6:
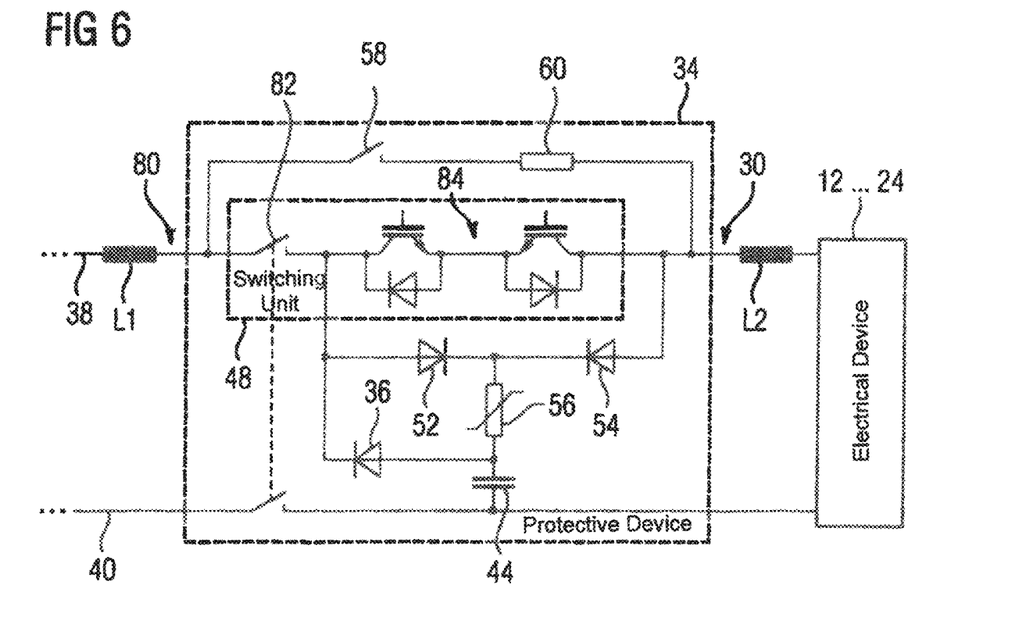
FIG. 6 shows a schematic circuit diagram of the protective device with an integrated pulse circuit based on FIG. 5.

FIG. 6 shows a development of the protective device 34 in FIG. 5, which simultaneously makes it possible to achieve overvoltage protection. For this purpose, anti-serially wired diodes 52, 54 are connected in parallel with the semiconductor switching element 84, the central connection of which is connected via a varistor 56 to the capacitor 44. At the same time, the capacitor 44 can also be charged to its predefined voltage via the varistor 56, so it is capable of providing the desired charge quantity. Furthermore, this configuration makes it possible to intercept voltage pulses, which exceed a predefined value with respect to their amplitude, and to store their power partially in the capacitor 44 and/or to convert them partially into heat by means of the varistor 56.

Furthermore, the protective device 34 in FIG. 6 comprises a series circuit comprising a further electromechanical switching element 58 and a further electrical resistor 60, by means of which an electrical connection between the line connection 80 and the device connection 30 can be established. As a result, pre-charging of a possible capacitor 76 can be achieved, so when the switching unit 48 is switched on, a large current pulse can be avoided or reduced.

The capacitor 44 should preferably have a low inherent conductivity, for example designed as a foil capacitor or the like. The diode 36 should be designed to be able to conduct a large current pulse, in other words, have a large limiting load integral as a result.

When the pulse circuit 42 is integrated into the protective device 34 it is possible to also detect faults in the pulse circuit 42, for example a defective diode 36 or a defective capacitor 44, for example in that a capacitor voltage of the capacitor 44 is detected.

By way of the invention it can be achieved that the overcurrent, which is caused by the short circuit 78, can be fed from a separate source, namely the capacitor 44, which does not have to be protected via a circuit breaker or the like. In the event that the capacitor 44 has a fault, for example a short circuit or the like, this can be intercepted by the diode 36, which in this case provides a blocking effect. As a result, a defective capacitor 44 is disconnected from the DC voltage power supply grid 10 and cannot have any adverse effects on it. In order to also intercept the case of a defective diode, two diodes could be wired in series.

The invention is particularly suitable when semiconductor switching devices are used. It can be achieved that a pre-definable period of time is significantly less than 1 ms. Preferably, the period of time can be, for example, about 100 µs or even less.

Furthermore, the invention is, of course, also suitable, in particular, when the DC voltage power supply grid 10 is spatially extensive. It can thus be provided that a plurality of pulse circuits 42 is connected at a predefined distance from the electrical lines 38, 40, for example at a distance of less than approximately 100 m, preferably at a distance of approximately 50 m or also less. If a line inductance of the lines 38, 40 is small, a distance between the protective device 34 and the pulse circuit 42 should be as low as possible, for example less than approximately 10 m or the like. The conductor inductances are denoted by $L_1$ and $L_2$ in FIG. 6.

The exemplary embodiments serve exclusively to explain the invention and are not intended to limit it.

The invention is furthermore not limited to application in power supply grids which use DC voltage. It can, of course, also be used in power supply grids which use an AC voltage as the supply voltage. The AC voltage can be a single-phase or a multi-phase, in particular a three-phase, AC voltage.

What is claimed is:

1. A DC voltage power supply grid for electrically coupling at least two electrical devices to an electrical power source connected to the DC voltage power supply grid having an electrical DC supply voltage, comprising:

a protective device having a sensor unit and a switching unit which are arranged between a respective one of the at least two electrical devices and the DC voltage supply grid for protecting the respective electrical device against an unintended overcurrent, with the switching unit being designed to deactivate a device connection between the DC voltage power supply grid and the respective electrical device when an unintended overcurrent has been detected,
- a pulse circuit connected to an input of the protective device for discharging a predefined electrical charge stored in a capacitor of the pulse circuit when the electrical DC supply voltage dips, wherein the predefined electrical charge is determined as a function of the unintended overcurrent and a time required for discharging the predefined electrical charge, and
- a first semiconductor switching element connected in series with the capacitor.

2. The DC power supply grid of claim 1, wherein the time required for discharging the predefined electrical charge is determined as a function of a characteristic property of the protective device.

3. The DC power supply grid of claim 1, wherein the protective is configured for detecting unintended overcurrents of different magnitudes, with the electrical charge stored in the capacitor of the pulse circuit being based on a greatest of the unintended overcurrents.

4. The DC power supply grid of claim 1, wherein the first semiconductor switching element comprises a first diode or is formed by a first diode.

5. The DC power supply grid of claim 1, wherein the first semiconductor switching element is designed to be controllable by a control signal.

6. The DC power supply grid of claim 5, further comprising a control unit, which is coupled to the sensor unit and provides the control signal.

7. The DC power supply grid of claim 1, further comprising a charging unit for charging the capacitor with the predefined electrical charge.

8. The DC power supply grid of claim 1, wherein the pulse circuit is formed integrally with the protective device.

9. The DC power supply grid of claim 1, wherein the first semiconductor switching element comprises a parallel circuit composed of a first diode and serial circuit composed of a second diode having an inverse polarity from the first diode and being connected at a central connection point to a resistor.

10. The DC power supply grid of claim 9, wherein the resistor is constructed as a varistor.

11. The DC power supply grid of claim 9, wherein the switching unit comprises a second semiconductor switching element and the pulse circuit comprises a third diode connected to the second diode, with the second diode being connected anti-serially to the third diode at the central connection point, and with the anti-serially connected second and third diodes being connected in parallel with the second semiconductor switching element.

12. A method for electrically coupling at least two electrical devices to a DC power supply grid connected to an electrical power source and having a predefined electrical supply voltage, comprising:
- protecting the at least two electrical devices against an unintended overcurrent by arranging respective protective devices between the DC power supply grid and respective ones of the at least two electrical devices,
- detecting with a sensor unit disposed in a respective one of the protective devices a respective electrical current and disconnecting the respective electrical device from the DC power supply grid with a switching unit when an unintended overcurrent has been detected,
- discharging a predefined electrical charge from an electrical charge stored in a capacitor of a pulse circuit when a voltage detected at an input of the respective protective device dips below the supply voltage, wherein the discharged electrical charge is determined at least as a function of the unintended overcurrent and a predefined period of time required for discharging the predefined electrical charge, wherein the capacitor is connected in series with a semiconductor switching element.

* * * * *

UNITED STATES PATENT AND TRADEMARK OFFICE
CERTIFICATE OF CORRECTION

| | | |
|---|---|---|
| PATENT NO. | : 11,837,864 B2 | Page 1 of 1 |
| APPLICATION NO. | : 17/418484 | |
| DATED | : December 5, 2023 | |
| INVENTOR(S) | : Hubert Schierling | |

It is certified that error appears in the above-identified patent and that said Letters Patent is hereby corrected as shown below:

In the Claims

In Column 15, Claim 3, Line 22: after "protective" insert --device--.

Signed and Sealed this
Twenty-sixth Day of March, 2024

Katherine Kelly Vidal
*Director of the United States Patent and Trademark Office*